United States Patent [19]

Ardaud et al.

[11] Patent Number: 5,162,558

[45] Date of Patent: Nov. 10, 1992

[54] BORON/NITROGEN PRECERAMIC POLYMERS AND BORON NITRIDE CERAMIC MATERIALS PRODUCED THEREFROM

[75] Inventors: Pierre Ardaud, Sainte-Foy-les-Lyon; Maurice Charpenel; Gerard Mignani, both of Lyons, all of France

[73] Assignee: Rhone-Poulenc Chimie, Courbevoie, France

[21] Appl. No.: 418,173

[22] Filed: Oct. 6, 1989

[30] Foreign Application Priority Data

Oct. 6, 1988 [FR] France .................... 88 13111

[51] Int. Cl.$^5$ .................... C07F 7/08; C07F 5/02
[52] U.S. Cl. .................... 556/402; 528/33; 528/38
[58] Field of Search ............ 556/402; 528/33, 38

[56] References Cited

U.S. PATENT DOCUMENTS 4,581,468 4/1986 Paciorek et al. .................... 556/403
4,767,728 8/1988 Riccitiello et al. ............ 556/402 X
4,851,491 7/1989 Riccietello et al. ............ 556/402 X

FOREIGN PATENT DOCUMENTS 0278734 8/1988 European Pat. Off. .
0310462 4/1989 European Pat. Off. ............ 556/402
2163761 3/1986 United Kingdom .

Primary Examiner—Paul F. Shaver
Attorney, Agent, or Firm—Burns, Doane, Swecker & Mathis

[57] ABSTRACT

Organometallic boron/nitrogen polymers, precursors of boron nitride, are prepared by reacting at least one trihalogenoborane with at least one silazane compound containing at least one ≡Si—NH—Si≡ group, by gradually introducing the silazane compound into the trihalogenoborane, while maintaining the reaction medium at a temperature ranging from −100° to 0° C. and wherein the ratio of the gram equivalents of the ≡Si—NH—Si≡ groups of the silazane to the number of moles of trihalogenoborane is greater than 1; the resulting organometallic polymers are facilely pyrolyzed into boron nitride ceramic materials.

26 Claims, No Drawings

BORON/NITROGEN PRECERAMIC POLYMERS AND BORON NITRIDE CERAMIC MATERIALS PRODUCED THEREFROM

BACKGROUND OF THE INVENTION

1. Field of the Invention

The present invention relates to novel organo-metallic polymers based on boron and nitrogen and to a process for the synthesis of such novel polymers.

This invention also relates to the use of such novel organometallic polymers in the production of ceramic materials and shaped articles based on boron nitride, especially boron nitride in fibrous form.

2. Description of the Prior Art

Boron nitride is increasingly in demand in this art in light of its high thermal stability, its impact strength, its great chemical inertness and its very good thermal conductivity. Furthermore, its low electrical conductivity makes it an insulating material of choice.

Several processes are presently known to the art for the preparation of boron nitride.

One such process includes reacting boron trichloride with ammonia in the gaseous state. A fine boron nitride powder is obtained in this manner, which may be sintered to produce solid shaped articles. However, the shaped articles thus produced exhibit a characteristic microporosity which may be highly detrimental for certain applications.

More recently, it was discovered that boron nitride could be produced by the pyrolysis of precursor polymers.

The advantage of this "polymer" method primarily resides in the form of the final product, and, more particularly, enables the production, after pyrolysis, of boron nitride fibers.

Thus, U.S. Pat. No. 4,581,468 describes a preceramic organoboron polymer prepared by the interaction of ammonia (ammonolysis) with a B-trichloro-N-tris(-trialkylsilyl)borazine (a cyclic compound) and which, as indicated, after drawing and pyrolysis at 970° C., results in the production of boron nitride fibers.

However, the beginning cyclic compound described in the patent is difficult to prepare and is thus expensive. Consequently, it is not realistically suitable for applications on an industrial scale.

SUMMARY OF THE INVENTION

Accordingly, a major object of the present invention is the provision of a simple, efficient, economical and readily applicable improved process for the preparation of organometallic polymers based on boron and nitrogen in a wide variety of useful forms (filaments, fibers, molded shaped articles, coatings, foils, films, and the like), and which various forms are facilely converted in high yields by weight, upon pyrolysis, into useful materials based on boron nitride.

Briefly, it has now surprisingly and unexpectedly been determined that organometallic polymers based on boron and nitrogen can be prepared by reacting at least one trihalogenoborane with at least one silazane compound comprising at least one $\equiv$Si—NH—S$\equiv$ group, and wherein said silazane compound is gradually introduced into said trihalogenoborane while maintaining the reaction medium at a temperature ranging from about $-100°$ C. to $0°$ C., with the ratio of the number of gram equivalents of the $\equiv$Si—NH—Si$\equiv$ groups of the silazane to the number of moles of trihalogenoborane being greater than 1, and then recovering the reaction product thus produced.

This invention also features the resulting organometallic polymers, per se, based on boron and nitrogen.

DETAILED DESCRIPTION OF THE PREFERRED EMBODIMENTS OF THE INVENTION

More particularly according to the present invention, it is known to this art to react a trihalogenoborane with a disilazane. One such process (compare K. A. Andrianov, *Bulletin of the Academy of Science, USSR*, 3, 1757-1758 (1962)) entails introducing a trihalogenoborane of the formula $BX_3$ into a hexaalkyldisilazane of the formula $(R_3Si)_2NH$, to produce a trialkylsilylaminodihalogenoborane of the formula $R_3SiNHBX_2$. Nonetheless, such a final product is merely a simple organoboron monomer and in any event cannot serve as an appropriate precursor of boron nitride.

Quite surprisingly and unexpectedly, however, it has now been discovered that, if the introduction of the reactives is reversed, i.e., if the silazane compound (in particular a disilazane) is introduced into the trihalogenoborane, the reaction medium is maintained at a relatively low temperature and the ratio of the number of gram equivalents of $\equiv$Si—NH—Si$\equiv$ groups of silazane to the number of trihalogenoborane is greater than 1, novel organometallic polymers are produced that are good precursors of boron nitride.

The preferred trihalogenoborane starting material is trichloroborane, but any other halogenoborane may also be used, such as, for example, a trifluoro-, a tribromo- or a triiodoborane.

The silazane compounds comprising at least one $\equiv$Si—NH—Si$\equiv$ group which are also starting materials in the present process are well known to this art and are available in the form of monomers, oligomers and cyclic or linear polymers. They may be prepared by a wide variety of processes from a broad range of initial materials, in particular by the ammonolysis or aminolysis of one or more organochlorosilanes, i.e., by reacting (a) at least one organohalogenosilane of the formula:

$$R_aX_{4-a}Si$$

wherein the R radicals, which may be identical or different, are each hydrogen atoms or hydrocarbon radicals, optionally substituted, and a is 0, 1, 2 or 3, with (b) at least one compound containing at least one $NH_2$ or NH group, such as, for example, ammonia and the primary or secondary amines.

Exemplary such silazane compounds are the following:

(i) Linear polymers of the formulae (I) or (II):

$$H_2N(R_2SiNH)_pSiR_2NH_2 \qquad (I)$$

$$R_3SiNH(R_2SiNH)_{p'}SiR_3 \qquad (II)$$

wherein the R radicals, which may be identical or different, are preferably hydrogen atoms or alkyl, cycloalkyl, aryl, alkylaryl and arylalkyl radicals; and p and p' are integers ranging from 1 to 1,000, preferably from 3 to 300 (see, for example, FR 1,086,932 and U.S. Pat. No. 2,564,674); and (ii) Cyclic polymers of the formula (III):

$$(R_2SiNH)_n \quad (III)$$

wherein the R radicals, which may be identical or different, are preferably hydrogen atoms or alkyl, cycloalkyl, aryl, alkylaryl and arylalkyl radicals; and n is an integer ranging from 3 to 10, preferably 3 or 4 (see, for example, GB 881,178).

In a preferred embodiment of the present invention, the silazane compound is a disilazane.

The disilazanes used in the process of the present invention are compounds well known to this art and may be prepared by any known means. Many are commercially available.

The compounds have the general formula (IV):

$$(R_3Si)_2NH \quad (IV)$$

wherein the R radicals, which may be identical or different, are hydrogen atoms or optionally substituted hydrocarbon radicals.

The preferred hydrocarbon radicals are the alkyl, cycloalkyl, aryl, alkylaryl and arylalkyl radicals.

Exemplary such alkyl radicals include the methyl, ethyl, propyl, butyl, pentyl, hexyl, heptyl and octyl radicals. Exemplary cycloalkyl radicals are the cyclopentyl, cyclohexyl and cycloheptyl radicals. Exemplary aryl radicals are phenyl and naphthyl. Exemplary alkylaryl radicals are the tolyl and xylyl radicals and exemplary arylalkyl radicals include benzyl and phenylethyl.

Suitable disilazane compounds, whether singly or in admixture, include the following:

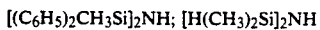

In another preferred embodiment of the invention, the hexaalkyldisilazanes are used.

Hexamethyldisilazane is particularly preferred.

The amounts of the reagents used in the process of the invention are important. As indicated above, the amount of the silazane compound must be in stoichiometric excess relative to the amount of trihalogenoborane, i.e., the ratio of the number of gram equivalents of the $\equiv Si-NH-Si\equiv$ groups of the silazane to the number of moles of trihalogenoborane must be greater than 1.

Preferably, these amounts are advantageously such that they correspond to a ratio of the number of gram equivalents of the $\equiv Si-NH-Si\equiv$ groups of the silazane to the number of moles of trihalogenoborane which is at least 1.5. Even more preferably, molar ratios of at least 2 are used. In practice, it has been found that the higher this ratio, the lower will be the residual chlorine content upon completion of the reaction. Finally, the ratio preferably should not exceed 4, as it has also been discovered that too much of an excess of the silazane compound results in the production of low molecular weight materials not suitable as ceramic precursors. According to the invention, a ratio of the number of gram equivalents of the $\equiv Si-NH-Si\equiv$ groups of the silazane to the number of moles of trihalogenoborane ranging from 2 to 3 is especially suitable.

It is an essential characteristic of the process according to the present invention that the silazane compound be introduced into the trihalogenoborane. This introduction, in contrast to a mixture of reagents of the quasi-instantaneous type, is carried out gradually, i.e., the pouring of the silazane compound into the trihalogenoborane is carried out over a prolonged period of time. In actual practice, depending on the amounts of the reagents used, this time period may vary from several minutes to several hours.

It should also be appreciated that the introduction of the silazane compound in a given ratio of the number of gram equivalents of the $\equiv Si-NH-Si\equiv$ groups of the silazane to the number of moles of trihalogenoborane may be carried out according to two different but equivalent embodiments: it may be carried out in a single reaction stage (continuous process) or several reaction stages (discontinuous stages).

Thus, more precisely and purely by way of illustration, if it is desired to react one mole of trihalogenoborane with three moles of disilazane, in actual practice two embodiments are possible:

(1) the first embodiment comprises introducing, in a single stage, the three moles of disilazane into the trihalogenoborane, then recovering the polymer formed;

(2) the second embodiment, in a first stage, introducing, for example, one mole of disilazane into the trihalogenoborane, then recovering the polymer formed and, in a second stage, introducing the remaining two moles of disilazane into the previously recovered polymer, under conditions essentially identical to those of the continuous introduction, then recovering the newly formed polymer.

During this continuous of discontinuous introduction, the reaction medium must be maintained at a relatively low temperature, i.e., the operation is carried out at a temperature ranging from $-100°$ C. to $0°$ C., preferably from $-60°$ C. to $-20°$ C.

The reaction is generally carried out at atmospheric pressure, but lower or higher pressures are also within the ambit of the invention.

The reaction between the disilazane and the trihalogenoborane may be carried out in mass or preferably in solution in an organic solvent of the aprotic and apolar type (hexane, pentane, toluene, etc.) and under anhydrous conditions.

Following the introduction of the disilazane, it is advantageous for the reaction to permit the reaction medium to age for a length of time, for example by allowing it to gradually return to ambient temperature.

It may also be of advantage, in order to better structure the polymer formed and thereby to increase the yield of the subsequent pyrolysis, to heat the reaction medium, for example by heating it to the reflux temperature of the solvent, over a period of time of from several minutes to several hours.

Upon completion of this reaction period, the polymer is separated from the reaction medium by any known means, for example by filtration or by extraction and decantation, in particular by liquid ammonia.

The polymer recovered in this manner, optionally after the elimination of the solvent (distillation or by other means), and then dried, constitutes the desired final product.

If necessary, the polymer obtained in this manner may be treated in a subsequent stage in order to further reduce its residual chlorine content. Such treatment entails contacting the polymer, in mass or preferably in an anhydrous organic solvent medium (hexane, pentane, toluene, etc.), with a compound containing a least one $NH_2$ group, hereinafter designated the "aminolysis" agent.

Exemplary such aminolysis agents include ammonia, primary amines, diamines (hydrazine, alkylhydrazine, hydrazide, alkylenediamine, etc.), amides, silylamines, and the like.

Preferably, compounds having the formula (V) are used:

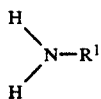
(V)

wherein the radical $R^1$ is a hydrogen atom, or a hydrocarbon or silyl radical. Especially suitable are the following:

(i) ammonia ($R^1$=hydrogen atom);
(ii) primary organoamines ($R^1$=alkyl, cycloalkyl, aryl, alkylaryl or arylalkyl radical), such as, for example, methyamine, ethylamine, propylamine, butylamine, pentylamine, hexylamine, heptylamine, octylamine, cyclopropylamine, phenylamine, and the like;
(iii) silylamines and more particularly the triorganosilylamines or the hydrogenoorganosilylamines, such as (hydrogenodimethylsilyl) amine.

The preferred aminolysis agents are the primary alkylamines and ammonia.

In an even more preferred embodiment of the invention, ammonia is used.

If necessary, this polymer may be heat treated in a later stage in order to further improve its pyrolysis behavior and thus its boron nitride weight yield. This later heat treatment, generally carried out at a temperature ranging from 100° to 200° C. and preferably under an ammonia atmosphere, has the effect of modifying the internal structure of the polymer, probably by increasing the cross-linking thereof, which could explain its improved heat resistance.

The boron and nitrogen based polymers produced according to the invention have a number average molecular weight ($\overline{Mn}$) ranging from 500 to 10,000, preferably from 1,000 to 5,000.

They also have a weight average molecular weight ($\overline{Mw}$) ranging from 600 to 100,000, preferably from 1,000 to 10,000.

Depending on the conditions of the particular embodiment of the process (ratio of the number of gram equivalents of the $\equiv$Si—NH—Si$\equiv$ groups of silazane to the number of moles of trihalogenoborane, heating to reflux, thermolysis), the polymers according to the invention may exist at ambient temperature in a form varying from a viscous or highly viscous oil to the solid state.

With the exception of the polymers subjected to a later stage of thermolysis, the polymers according to the invention are fusible and soluble in most of the usual organic solvents (hexane, toluene, etc.), which may be advantageous relative to their forming processes.

The polymers based on boron and nitrogen according to the invention find a very notable application in the production of ceramic materials or shaped articles containing, at least in part, boron nitride.

In the most general case (the provision of powders), the polymer is pyrolyzed in an inert atmosphere, in a vacuum or preferably under ammonia, at a temperature of from 100° to 2,000° C. until the polymer is completely converted into a ceramic based on boron nitride.

The polymer may also be formed prior to the pyrolysis, for example by molding or extrusion, in order to ultimately produce highly diverse configurations, such as filaments, fibers, molded articles, coatings of a support, and others. If it is desired to produce fibers, the polymer is extruded by means of a conventional extruder (optionally after melting, it the polymer is initially in the solid state), then heat treated at a temperature of from 100° to 2,000° C., preferably under an ammonia atmosphere, to yield boron nitride fibers.

The fibers thus obtained may then be used as a reinforcing material for composite materials of the ceramic/ceramic, ceramic/plastic or ceramic/metal type.

In order to further illustrate the present invention and the advantages thereof, the following specific examples are given, it being understood that same are intended only as illustrative and in nowise limitative.

EXAMPLE 1

Into a 2 liter flask and under nitrogen, at $-50°$ C., 810 dry toluene and 150 g $BCl_3$ (1.28 mole) were introduced. Next, over 1 hour, 30 min, 430 g hexamethyldisilazane (2.66 mole) were poured into the flask, with the temperature being maintained at about $-30°$ C. The medium was then permitted to return, overnight, to ambient temperature. The mixture was then heated to reflux over 4 hours.

After filtration under nitrogen and evaporation, 103 g of a highly viscous oil were recovered.

The characteristics of the resulting polymer were as follows:
(a) Residual chlorine content: 0.3% by weight;
(b) $\overline{Mn}$=1,140, $\overline{Mw}$=3,270, Ip=2.86 (index of polydispersity);
(c) TGA (850° C. under helium): 32.7% by weight.

EXAMPLE 2

Into a two liter reactor, under nitrogen, at $-25°$ C., 848 ml dry hexane and 170 g $BCl_3$ (1.45 mole) were introduced. Next, over 11 hours, 705 g hexamethyldisilazane (4.36 moles) were poured into the reactor at a temperature ranging from $-22°$ to 11° C. The medium was then permitted, overnight, to return to ambient temperature. Then, after filtering under nitrogen and evaporation of the solvent, 160 g of a highly viscous oil were recovered.

The characteristics of the resulting polymer were as follows:
(a) Residual chlorine content : 0.1% by weight;
(b) $\overline{Mn}$>1,000, $\overline{Mw}$>3,000;
(c) TGA (850° C. under helium) : 33.6% by weight.

EXAMPLE 3

Into a 2 liter flask, under nitrogen, at $-28°$ C., 840 g dry hexane and 150 $BCl_3$ (1.28 mole) were introduced. Next, over 5 hours, 415 g hexamethyldisilazane (2.57 moles) were poured into the flask. During the pouring operation, the temperature was maintained between $-25°$ and $-20°$ C. The mixture was then permitted to return to ambient temperature over 16 hours. By filtration under nitrogen, a clear solution was recovered, which by evaporation provided 150 g of a highly viscous oil.

The residual chlorine content in the polymer then was 1.2% by weight.

Subsequently, into a 2 liter reactor under nitrogen, 150 g of the oil obtained previously and 370 g dry hexane were introduced, followed by the introduction, over 20 min, of gaseous ammonia (dried over a KOH column). The reaction was slightly exothermic. After filtration under nitrogen and evaporation of the solvent, 145 g of a white solid were recovered, which constituted the desired final product.

The characteristics of the resulting polymer were as follows:
(a) Softening temperature 90° C.;
(b) Melting temperature: 150° C.;
(c) Residual chlorine content: 0.1% by weight;
(d) $\overline{Mn}=1,550$, $\overline{Mw}=5,790$, Ip=3.73;
(e) Solubility: hexane, toluene;
(f) TGA (850° C. under helium): 18.60% by weight.

EXAMPLE 4

Into a 3 liter flask, dried under nitrogen and at $-78°$ C., 950 ml of dry hexane and 159 g BCl$_3$ (1.35 mole) were introduced. Subsequently, over 2 hours, 220 g hexamethyldisilazane (1.35 mole) were poured into the flask. During the pouring operation, the temperature was maintained at about $-60°$ C. The mixture was then permitted to return to ambient temperature over 16 hours. After filtration under nitrogen and evaporation, 123 g of a clear oil were recovered.

The residual chlorine content was then 39.5% by weight.

Subsequently, into a 1 liter flask dried under nitrogen at $-60°$ C., 600 ml dry toluene and 44 g of the oil previously obtained were introduced. Next, over 45 min, 90.2 g hexamethyldisilazane (0.558 mole) were poured into the flask. The mixture was permitted to return to ambient temperature overnight. After filtering and evaporation, 45.2 g of a low viscosity oil were recovered.

The characteristics of the resulting polymer were the following:
(a) Residual chlorine content: 0.2% by weight;
(b) TGA (under He at 850° C.)=16.43% by weight.

EXAMPLE 5

Into a 250 ml reactor, dried under nitrogen, 9.9 g of the polymer obtained in Example 4 were introduced and heated to 150° C., over 4 hours, under ammonia. After cooling, 4.8 g of an infusible white solid were obtained.

TGA (under He at 850° C.) of this polymer was 37.8% by weight.

Pyrolysis of this polymer under NH$_3$ at 1,000° C. produced a completely white ceramic. The yield of pyrolysis was 36% by weight.

IR and RAMAN analyses evidenced that boron nitride had been produced. A study of the X-ray spectrum of the polymer pyrolyzed under argon at a temperature of from 1,000° to 1,500° C. showed that the boron nitride was in the hexagonal form.

EXAMPLE 6

Into a three-necked 1 liter flask, under nitrogen introduced. Next, 234 g (1.45 mole) hexamethyldisilazane were poured into the flask, over 1 hour, with the temperature being maintained at about $-35°$ C. The mixture was permitted to warm to ambient temperature. It was then heated to reflux over 6 hours. After cooling, it was filtered under nitrogen and, by evaporating the filtrate, 46.6 g of a white solid were recovered.

The characteristics of the resulting polymer were the following:
(a) Residual chlorine content <0.1% by weight;
(b) $\overline{Mn}=1,100$;
(c) $\overline{Mw}=3,500$;
(d) IP=2.80;

EXAMPLE 7

Into a three-necked 1 liter flask, under nitrogen, 371 g of dry toluene and 88 g (075 mole) BCl$_3$ were introduced at $-35°$ C. Next, over 1 hour, 243 g (1.5 mole) hexamethyldisilazane were poured into the flask. The temperature maintained at about $-35°$ C.

The mixture was then permitted to warm to ambient temperature and was then heated to reflux over 1 hour. After cooling, it was filtered under nitrogen and, by evaporating the filtrate, 67.5 g of a viscous oil were recovered.

The characteristics of the resulting polymer were the following:
(a) Residual chlorine content <0.1% by weight;
(b) $\overline{Mn}=1,090$;
(c) $\overline{Mw}=3,060$;
(d) IP=2.81;
(e) TGA (850° C. under helium): 37.13% by weight.

EXAMPLE 8

Into a three-necked 1 liter flask under nitrogen, 345 g of dry toluene and 59 g (0.503 mole) BCl$_3$ were introduced, at $-35°$ C. Next, over 1 hour, 233 g (1.06 mole) hexamethyltrisilazane (cyclic compound having the formula [Si(CH$_3$)$_2$—NH]$_3$) were poured into the flask. The temperature was maintained at about $-35°$ C.

The mixture was then permitted to warm to ambient temperature and was then heated to reflux over 1 hour. After cooling, it was filtered under nitrogen and, by evaporating the filtrate, 118 g of a viscous oil were recovered.

The characteristics of the resulting polymer were the following:
(a) Residual chlorine content: 4% by weight;
(b) $\overline{Mn}=1,000$;
(c) $\overline{Mw}>2,000$;
(d) TGA (850° C. under helium): 15.33% by weight.

EXAMPLE 9

Into a three-necked 3 liter flask, under nitrogen at $-35°$ C., 1,136 g dry toluene and 222 g BCl$_3$ (1.88 mole) were introduced. Next, 764 g (4.74 mole) hexamethyldisilazane were poured into the flask, over 1 hour. The mixture was permitted to warm to ambient temperature. It was then heated to reflux over 4 hours. After cooling, it was filtered under nitrogen and, by evaporating the filtrate, 190 g of a clear oil were recovered.

The characteristics of the resulting polymer were the following:
(a) Residual chlorine content<0.1% by weight;
(b) $\overline{Mn}=730$;
(c) $\overline{Mw}=1,370$;
(d) IP=1.88;
(e) TGA (850° C. under helium): 23.5% by weight;
(f)

---

(a) Residual chlorine content < 0.1% by weight;
(b) $\overline{Mn}$ = 730;
(c) $\overline{Mw}$ = 1,370;
(d) IP = 1.88;
(e) TGA (850° C. under helium): 23.5% by weight;

Pyrolysis, at 1,000° C. and under ammonia, provided a completely white ceramic with a yield of pyrolysis of 24.7%.

Elemental, IR and RAMAN analyses evidenced that boron nitride had been produced.

EXAMPLE 10

Into a three-necked 3 liter flask, under nitrogen at −35° C., 1,050 g dry toluene and 220 g BCl$_3$ (1.87 mole) were introduced. Next, 664 g (4.12 mole) hexamethyldisilazane were poured into the flask, over 45 minutes. The mixture was permitted to warm to ambient temperature and the trimethylchlorosilane formed was slowly eliminated. The total duration of the reflux was 16 hours. After cooling, it was filtered under nitrogen and, by evaporating the filtrate, 112 g of a white solid were recovered.

The characteristics of the resulting polymer were the following:
(a) $\overline{M}n=630$;
(b) $\overline{M}w=2,390$;
(c) IP=3.8;
(d) Residual chlorine content <0.1% by weight;
(e) TGA (850° C. under helium): 39.5% by weight.

The polymer was soluble in toluene, CH$_2$Cl$_2$, CHCl$_3$.

Pyrolysis, at 1,000° C. under ammonia, provided an entirely white ceramic with a yield of pyrolysis of 34%.

Elemental, IR and RAMAN analyses evidenced that boron nitride had been produced.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of an organometallic boron/nitrogen polymer, comprising reacting at least one trihalogenoborane with at least one silazane compound containing at least one ≡Si—NH—Si≡ group, by gradually introducing said silazane compound into said trihalogenoborane, while maintaining the reaction medium at a temperature ranging from about −100° C. to 0° C., with the ratio of the number of gram equivalents of the ≡Si—NH—Si≡ groups of the silazane to the number of moles of trihalogenoborane being greater than 1, and then recovering the organometallic polymer thus produced.

2. The process as defined in claim 1, comprising carrying out the reaction in mass.

3. The process as defined in claim 1, comprising carrying out the reaction in solution, in an anhydrous organic solvent.

4. The process as defined in claim 1, said halogenoborane comprising trichloroborane.

5. The process as defined by claim 1, wherein the amount of the respective reagents are such that the ratio of the number of gram equivalents of the ≡Si—N-H—Si≡ groups of the silazane to the number of moles of trihalogenoborane is at least 1.5.

6. The process as defined by claim 5, wherein said ratio is about 2.

7. The process as defined by claim 5, wherein said ratio does not exceed 4.

8. The process defined by claim 1, said silazane compound having one of the formulae (I) or (II):

$$H_2N(R_2SiNH)_pSiR_2NH_2 \quad (I)$$

$$R_3SiNH(R_2SiNH)_{p'}SiR_3 \quad (II)$$

wherein the radicals R, which may be identical or different, are each a hydrogen atom or an alkyl, cycloalkyl, aryl, alkylaryl or arylalkyl radical; and p and p' are integers ranging from 1 to 1,000.

9. The process as defined by claim 8, wherein said formulae (I) and (II), p and p' range from 3 to 300.

10. The process as defined by claim 1, wherein said silazane compound comprises a cyclic compound having the $$(R_2SiNH)_n \quad (III)$$

wherein the radicals R, which may be identical or different, are each a hydrogen atom or an alkyl, cycloalkyl, aryl, alkylaryl or arylalkyl radical; and n is an integer ranging from 3 to 10.

11. The process as defined by claim 10, wherein said formula (III), n is 3 or 4.

12. The process as defined by claim 1, said silazane compound having the following formula (IV):

$$(R_3Si)_2NH \quad (IV)$$

wherein the radicals R, which may be identical or different, are each a hydrogen atom or an optionally substituted alkyl, cycloalkyl, aryl, alkylaryl or arylalkyl radical.

13. The process as defined by claim 12, wherein said formula (IV), the radical R is a hydrogen atom or an alkyl radical.

14. The process as defined by claim 1, said silazane compound comprising a hexaalkyldisilazane.

15. The process as defined in claim 14, said silazane compound comprising hexamethyldisilazane.

16. The process as defined by claim 1, further comprising treating the organometallic boron/nitrogen polymer produced with a compound containing at least one NH$_2$ group, whereby reducing the residual halogen content thereof.

17. The process as defined by claim 16, said NH$_2$ compound having the following formula (V):

$$\begin{array}{c} H \\ \phantom{H}\diagdown \\ \phantom{HHH}N\!-\!R^1 \\ \phantom{H}\diagup \\ H \end{array} \quad (V)$$

wherein R$^1$ is a hydrogen atom, or a hydrocarbon or silyl radical.

18. The process as defined by claim 17, wherein said formula (V), R$^1$ is a hydrogen atom or an alkyl radical.

19. The process as defined by claim 1, further comprising heat treating the organometallic boron/nitrogen polymer thus produced, whereby enhancing the pyrolysis resistance thereof.

20. The organometallic boron/nitrogen polymer prepared by the process as defined by claim 1.

21. The organometallic boron/nitrogen polymer as defined by claim 20, having a number average molecular weight ranging from 500 to 10,000.

22. The organometallic boron/nitrogen polymer as defined by claim 21, having a number average molecular weight ranging from 1,000 to 5,000.

23. The organometallic boron/nitrogen polymer as defined by claim 21, having a weight average molecular weight ranging from 600 to 100,000.

24. The organometallic boron/nitrogen polymer as defined by claim 22, having a weight average molecular weight ranging from 1,000 to 10,000.

25. The organometallic boron/nitrogen polymer prepared by the process as defined by claim 16.

26. The organometallic boron/nitrogen polymer prepared by the process as defined by claim 19.

* * * * *